United States Patent [19]

Berkebile et al.

[11] Patent Number: 5,108,627

[45] Date of Patent: Apr. 28, 1992

[54] FILTER UNDERDRAIN BLOCK

[75] Inventors: Dean T. Berkebile, Mars; Gerald D. Wolfe, Zelienople, both of Pa.

[73] Assignee: F.B. Leopold Company, Inc., Zelienople, Pa.

[21] Appl. No.: 649,448

[22] Filed: Feb. 1, 1991

[51] Int. Cl.⁵ .............................................. B01D 24/46
[52] U.S. Cl. ................................... 210/793; 210/274; 210/275; 210/293
[58] Field of Search ................. 210/793, 274, 275, 293

[56] References Cited

U.S. PATENT DOCUMENTS

| | | | |
|---|---|---|---|
| 2,710,692 | 6/1955 | Kegel et al. | 210/130 |
| 3,110,667 | 11/1963 | Stuppy | 210/275 |
| 4,065,391 | 12/1977 | Farabaugh | 210/274 |
| 4,214,992 | 7/1980 | Sasano et al. | 210/274 |

OTHER PUBLICATIONS

"Filter Underdrains Problems and New Developments", J. P. Hambley, P. Eng., Oct. 1989.
"Flexscour TM, The Ultimate Underdrain System", EIMCO.

Primary Examiner—Charles Hart
Attorney, Agent, or Firm—Webb, Burden, Ziesenheim & Webb

[57] ABSTRACT

A filter block having a plurality of exterior and interior walls defining a plurality of interior chambers, said chambers including at least a first and second conduits parallel to the longitudinal axis of said block, one disposed above the other, with a third conduit provided to supply gas under pressure to the upper conduit; a top exterior wall of the block having a plurality of apertures distributed thereover. The interior chambers comprise separate conduits for both gas and liquid backwash flows. The interior walls defining the conduits are disposed to provide even distribution of the backwashing gas and to provide bearing support for the top wall of the block.

17 Claims, 2 Drawing Sheets

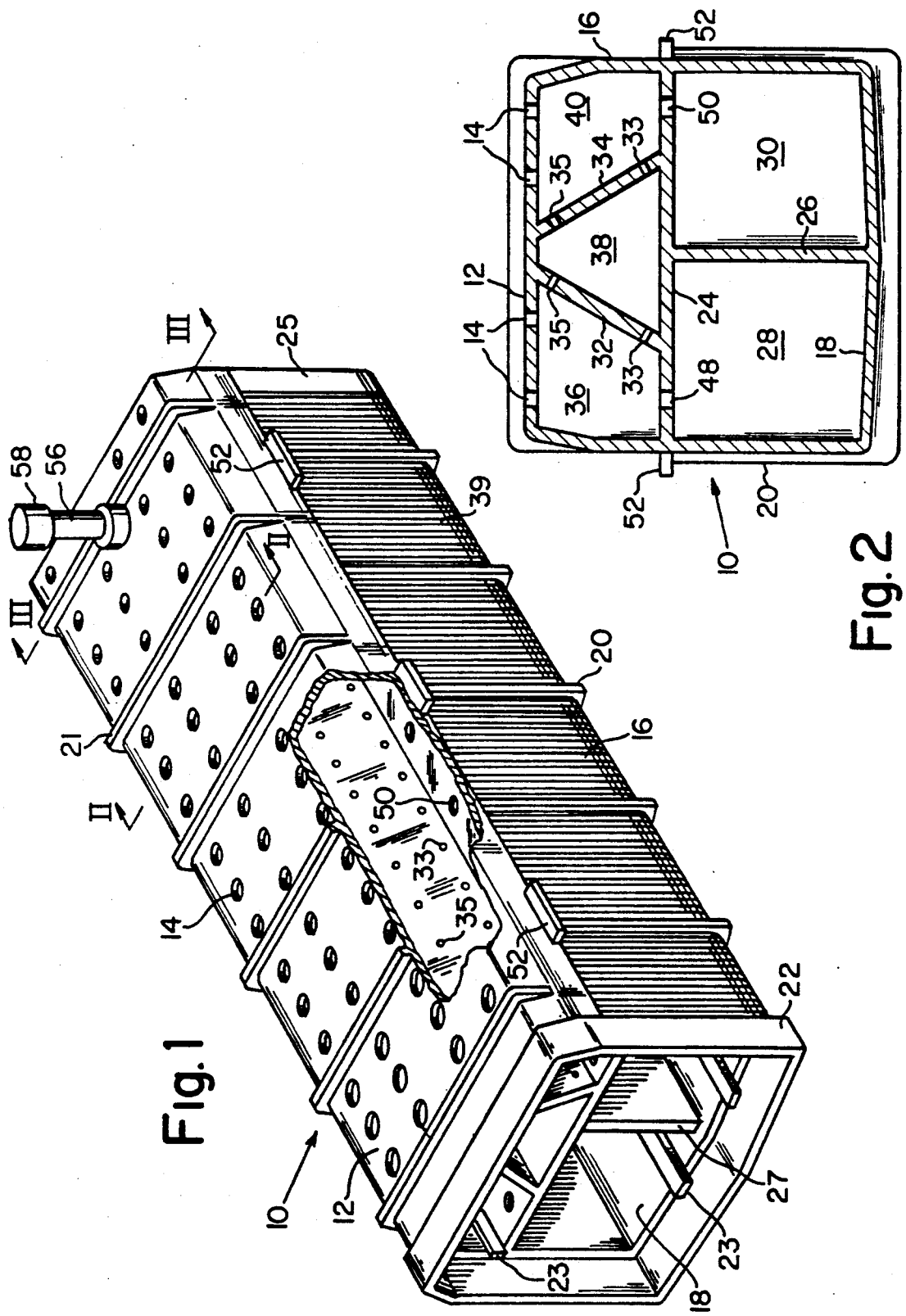

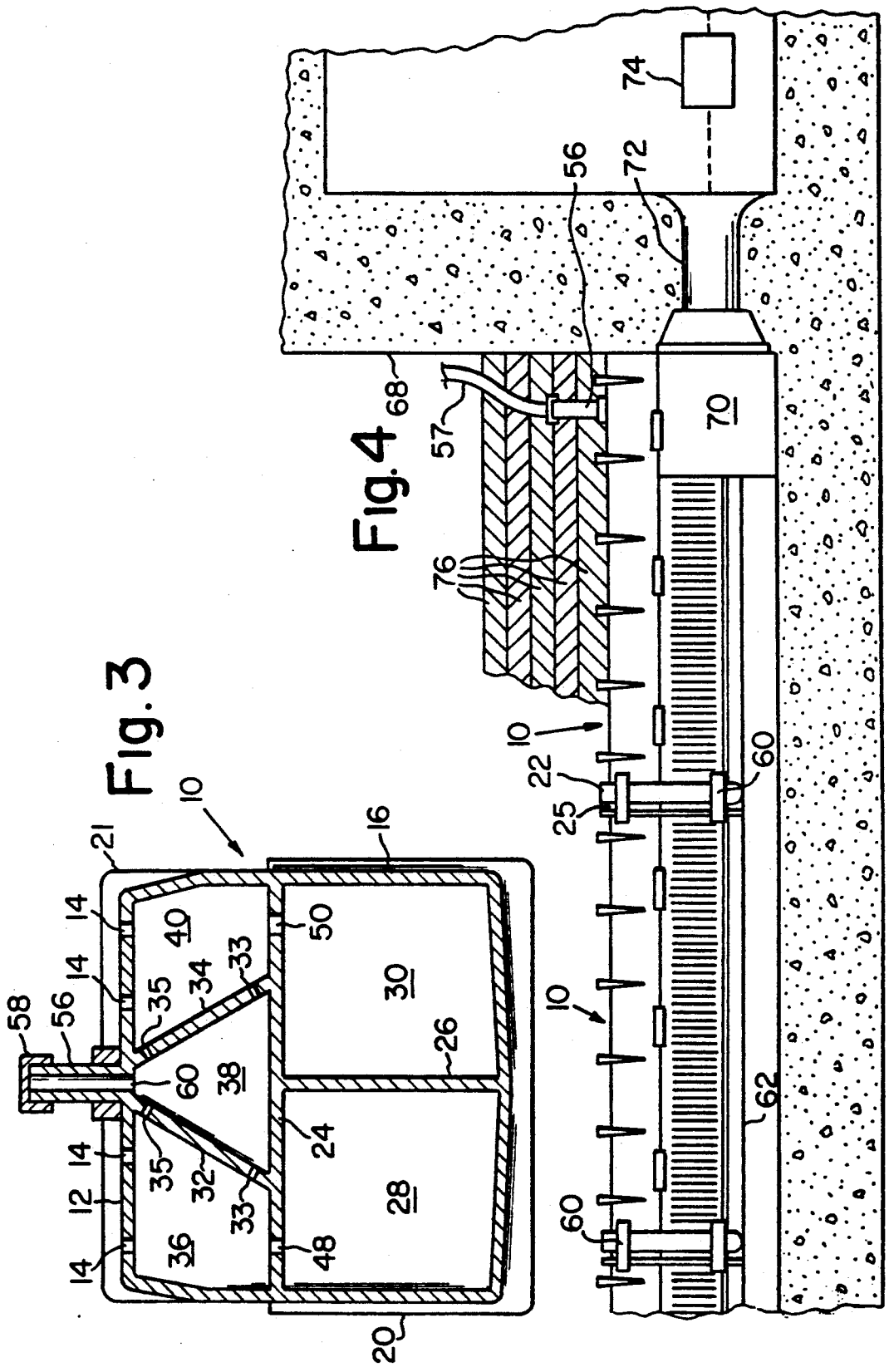

FILTER UNDERDRAIN BLOCK

BACKGROUND OF THE INVENTION

1. Field of the Invention

This invention generally relates to filter bottoms for use in filters for liquids, and more particularly to the structure of a filter block for underdrains which when assembled form a filter bottom for supporting a bed of finely divided filtering media. The filter bottom provides liquid flow conduits below the bed of filtering media, which conduits make possible the collection of filtered liquid and the distribution of gas and fluid backwash. The present invention is especially directed to a filter bottom providing a virtually complete, uniform distribution of gas and fluid backwash media throughout the entire filter bed while requiring a minimum amount of energy to thoroughly and evenly backwash the filtering media. The invention features special and novel aspects which are primarily directed to the establishment and maintenance of an usually high degree of uniformity of gas and fluid backwash distribution at minimum energy expense while markedly broadening the range of allowable backwash flow rates.

2. Description of the Prior Art

Several assemblies for filter bottoms are known in the art, particularly, assemblies having individual units called filter blocks, which are assembled together and interconnected with the appropriate supplies and drains. The filter blocks, when assembled provide an upper surface for supporting a filter media. The filter bottom upper surface is provided with apertures to allow the flow of filtered liquid from the filter media to pass into the filter bottom where conduits carry the filtered liquid from the filter. The conduits also serve to provide backwashing fluids, either gas or liquid or both, to the filter media for cleaning.

The filter bottom is covered with filtering media such as a bed of relatively coarse aggregate (the particles being too large to pass through the apertures in the top of the block), and several additional layers of graded material of larger to smaller and back to larger size farther above the filter bottom.

Conventionally, the liquid to be filtered, typically water, enters from above, passing downwardly through the filtering media, through the various layers of coarser particles, then through the apertures in the tops of the blocks, through conduits in the blocks, and out through a take-off flume. Gravity flow moves the liquid to be treated through the filter.

Periodically, the flow of liquid to be filtered is shut off and a washing medium is forced through the filter in reverse direction.

The wash medium (typically water) flows from the flume into the conduits which distribute it laterally away from the flume and from the conduits up through the separate upper chambers, the beds of particulate filtering material and out at the top, thereby carrying off deposited particles dislodged from the filter media. The backwash procedure usually includes first air backwashing before water backwashing. The air backwashing step loosens and separates the particles of the filter bed and then the subsequent water backwashing step fluidizes the bed and carries the deposited particles upward and from the bed. In many instances, air and water are used simultaneously. In all steps, the air and water flow through the bed must be uniformly distributed over the area of the bed. If the backwashing flow is not uniformly distributed, then the filter areas of low backwash velocity provide little backwashing effect and in areas of high fluid velocity, the flow will cause filter media to be carried upward and lost to disposal. Moreover, when the filter media is present in layers of different particulate materials, or different particulate size, non-uniform backwashing can cause undesired mixing of the particulate layers.

One type of the prior art filter blocks is shown in U.S. Pat. No. 3,110,667 to Stuppy. Each filter block includes a pair of parallel upper and a pair of parallel lower conduits, shown in cross-section in FIG. 6. Water from the filter passes through apertures in the top of each block into the upper conduits, then through ports in the floors of the upper conduits into the lower conduits. The liquid then flows from block to block to a flume. The Stuppy patent also proposes a liquid backwash wherein liquid is supplied to the lower conduits, passes upwards through the ports to the upper conduits and out the apertures to the filter media.

U.S Pat. No. 4,065,391 to Farabaugh discloses another configuration of filter block which does not include upper and lower conduits, but instead has an arrangement of parallel primary and secondary conduits positioned horizontally adjacent each other and separated by inclined walls. The inclined walls contain relatively smaller gas metering orifices and relatively larger liquid metering orifices with the liquid metering orifices positioned below the gas metering orifices. Backwash gas or liquid is supplied through the primary conduits, passes through the metering orifices into the secondary conduits, and from the secondary conduits into the bed of filter media. The gas metering orifices control the rate at which a backwash gas passes from the primary to the secondary conduits. The liquid metering orifices, and to a lesser extent the gas metering orifices, control the flow rate of a liquid backwashing medium.

The prior art filter block devices are deficient as to backwash operations. For example, the Stuppy device has relatively large liquid ports between the upper and lower conduits. If, although not disclosed in the Stuppy patent, a gas backwash were used with the device, the gas would be supplied to the lower conduits but then would pass easily through the first few of the relatively large liquid ports encountered to the upper conduits resulting in significantly unequal distribution of gas through the filter bottom. The uneven distribution of gas during such a backwash would serve to disrupt the filter media where too much gas flow occurs and to provide inadequate cleaning of the filter media where insufficient gas distribution occurs.

The Farabaugh device depends on a gas/liquid interface to control gas distribution during gas backwash. When gas backwashing begins, since the entire block and the filtering media above it is under water at that time, each of the conduits is essentially filled with water. When backwash gas is supplied to the primary conduit, a gas/liquid interface is formed as shown in FIG. 6 of the Farabaugh patent, and gas is metered to the secondary conduits via the gas metering orifices in the upper portion of the wall separating the primary and secondary conduits. However, the Farabaugh system can tolerate only a limited range of backwashing flow. If that limit is exceeded, the gas/liquid interface level is forced down to a point at which gas escapes into the secondary conduits through the oversized liquid metering orifices which are also located in the wall separating the primary and secondary conduits. Because of the rapid escape of the gas through the oversized liquid metering orifices, unequal distribution of the backwash gas, with its consequent disadvantages, occurs.

An additional problem with the Farabaugh device is that standing waves, created by a variety of phenomena during backwash of the filter such as a pressure shock from a sticking gas valve or other causes, can further limit the range of backwash flows. When such a standing wave is formed during backwash, it can reduce the level of the liquid/gas interface upstream of the wave so that the large liquid metering orifices are exposed to the gas flow, again creating unequal distribution of backwash gas.

It has also been found in the operation of filter bottoms as taught by Farabaugh that waves which frequently occur on the surface of the liquid in the filter, by changing temporarily the liquid pressure head over portions of the filter bottom, can thereby change the level of the liquid/gas interface in the primary conduit. This fluctuation in the level of the interface cyclically exposes then covers the oversized liquid metering orifices in the primary conduit to the gas above the interface, and, consequently, results in maldistribution of gas backwash as the oversized orifice is exposed.

The dependency of the Farabaugh design on a liquid/gas interface also limits the backwash rates which can be used during simultaneous gas and liquid backflush. The typical upper limit for simultaneous backwash in the Farabaugh device is approximately 5 standard cubic feet per minute ("SCFM") gas per square foot of filter bottom upper surface and 5 gallons per square foot of filter bottom per minute ("GSFM"). It has been proposed that raising one or both of the backwash rates simultaneously would increase scouring and cleaning of the filter media. However, the Farabaugh device, with its limitation of the gas/liquid interface can only accommodate simultaneous backwash rates within a limited range.

Finally, another problem with the Farabaugh device is that, because of the presence of the large liquid metering orifices in the primary conduit, it is particularly susceptible to problems stemming from non-level installation of the filter blocks. At column 5, line 14, Farabaugh states that the liquid metering orifices are preferably placed about 3½ inches below the gas metering orifices. Accordingly, even slight errors in installation of the filter blocks can markedly reduce the vertical distance between the lowest gas orifice and the highest liquid orifice which share the same gas/liquid interface. This non-level installation significantly reduces the safe operating range for gas backwashing to avoid escape of the gas through the liquid orifices. Although modifications of the Farabaugh device have been proposed, extending the vertical distance between the gas and liquid metering orifices to almost 9 inches, the same problems still occur.

The previously known filter block arrangements suffer from sensitivity to non-level alignment of the blocks. Even small divergences from level alignment of the blocks leads to significantly non-uniform backwashing performance, particularly when the backwash medium is a gas. Accordingly, it is an object of this invention to provide a filter underdrain block structure which when assembled and arranged to form a filter bottom, maximizes uniform distribution of backwashing gas and backwashing liquid, fluidizes the filtration media over the underdrain block, dislodges dirt and debris entrapped in the filter media, and thoroughly cleans the media.

It is another object of the present invention to provide a filter block underdrain with a reduced sensitivity to non-level block alignment, particularly with regard to gas backwashing. A further object of the invention is to provide a filter block weighing less than conventional filter blocks yet having a good structural integrity thereby being easier to handle and easier to install than conventional clay filter blocks.

Other objects and advantages of the present invention will be apparent from the following detailed description and from the appended drawings.

SUMMARY OF THE INVENTION

The present invention, generally described, provides a filter block having both upper and lower conduits or chambers and having conduits for distribution of liquid backwash which are separate from a conduit for distribution of gas backwash.

In a preferred embodiment, the upper chambers comprise a primary gas conduit and two secondary conduits. The lower chambers comprise two primary liquid conduits. The primary gas conduit is in communication with the secondary conduits via appropriately sized gas orifices to allow the flow of gas from the primary gas conduit to the two secondary conduits. Liquid orifices are provided between the secondary conduits and the primary liquid conduits to allow the flow of liquids between the secondary conduits and the primary liquid conduits.

Filtered liquid passes through apertures in the top of the filter block, into the secondary conduits, through orifices into the primary liquid conduits and from block to block to a flume. The primary gas conduit essentially does not contribute to the flow of liquids during filtering operations.

During backwash operations, gas or liquid backwash can be carried on simultaneously or independently. Gas backwash flow is supplied to the primary gas conduits and is passed from block to block across the filter bottom. Backwash gas passes from the primary gas conduit through the gas orifices to the secondary conduits. Liquid backwash flow is supplied to the primary liquid conduits and is distributed thereby evenly across the filter bottom. Backwash liquid passes from the primary liquid conduits through liquid orifices into the secondary conduits, through the apertures in the top surface of the filter bottom to the filter media.

Having separate primary conduits for the gas backwash and the liquid backwash, with the primary gas conduit specially designed with all orifices therefrom constituting gas orifices, (as compared to having only one primary conduit designed to accomplish both liquid and gas backwash), provides significant advantages over the prior art. The present invention allows for a greatly increased range of gas backwash flow rates, increased simultaneous gas/liquid backwash rates, the minimization of problems inherent in systems dependent on a gas/liquid interface during backwash, and numerous other advantages.

BRIEF DESCRIPTION OF THE DRAWINGS

FIG. 1 is a perspective view of one embodiment of the present invention;

FIG. 2 shows a cross-section of the filter block of FIG. 1 taken along lines 2—2 of FIG. 1;

FIG. 3 is a view along lines 3—3 of FIG. 1; and

FIG. 4 is a side view, partly broken away and partly in section, of a series of filter blocks connected end-to-end with layers of filter media on top.

DETAILED DESCRIPTION OF THE INVENTION

With reference now to the drawings wherein like numerals designate corresponding parts throughout the several views, there is shown in FIG. 1 a preferred embodiment of a filter block 10 of the present invention and which has a top wall 12 provided with a plurality of apertures, one of which is indicated at 14, distributed in a substantially even pattern over the top wall 12. The block may be integrally formed by injection molding with a pair of side walls 16 and a bottom wall 18 with a plurality of reinforcing ribs 20, 21 formed on the exterior surface of the walls 12, 16 and 18. Additionally, a plurality of reinforcing ribs 23 may be formed on the interior surface of walls 16 and 18. Ribs 23 may or may not extend the full length of block 10.

At one end, a receiving collar 22 is provided having dimensions to snugly interfit with an adjacent block which will have an end configuration to closely interfit within the collar 22. This close fit substantially prevents either gas or liquid from entering or exiting the interior of the assembled blocks during use. Grouting and/or an adhesive is employed to provide a fluid-tight joint between the ends of the blocks. It will be understood that an opposite end 25 of each block 10 may be molded to the desired size and shape to facilitate the assembly of an interlocking relationship along an axis of the filter bed.

With reference now to FIG. 2, there is shown a cross-sectional view along lines 2—2 of FIG. 1 wherein a transverse wall 24 extends from one side wall 16 to the opposite side wall 16 to divide the interior of the block 10 into an upper and a lower portion. The lower portion is further divided by a partition 26 into a pair of primary liquid conduits or chambers 28 and 30 which are substantially rectangular in cross-section and which extend parallel to the longitudinal axis of the block 10 and to each other along the length of the block 10. The lower portion may be still further divided by another partition (not shown) to enhance the structural integrity of block 10. The upper portion is further divided by a pair of angularly extending walls 32 and 34 into three chambers, secondary conduits 36 and 40, and a primary gas conduit 38, all of which also extend parallel to the longitudinal axis of the block and extend along the length of each block 10. Secondary conduits 36 and 40 receive water or liquid passing down through the filter bed and through the apertures 14 provided in wall 12. Primary gas conduit 38 serves to distribute backwash gas axially along the length of the filter block 10 and through apertures in walls 32 and 34 into secondary conduits 36 and 40. As is also apparent in FIG. 1, an end portion 27 of wall 26 is recessed from the end of filter block 10 to allow the communication of fluids between primary liquid conduits 28 and 30.

Secondary conduit 36 is in communication through a plurality of liquid orifices 48 with primary liquid conduit 28 while a plurality of liquid orifices 50 in wall 24 provide flow communication between conduits 40 and 30. Liquid orifices 48 and 50 are provided in evenly spaced relation along wall 24.

Walls 32 and 34 adjacent wall 24 are each provided with a plurality of gas orifices along the length of the block as at 33 and 35. These gas orifices are sized so that during backwash operations when gas is supplied to primary gas conduit 38, the injected gas forces the water out of primary gas conduit 38 and an even distribution of gas is accomplished along the length of primary gas conduit 38 through gas orifices 33 and 35.

In a preferred embodiment of the present invention, each filter block is designed to provide the width of 1 foot (measured in the direction of wall 24) of filter bottom. Secondary conduits 36 and 40 each have approximately 16.9 square inches of cross-sectional area. Primary gas conduit 38 has approximately 17.4 square inches of cross-sectional area. Primary liquid conduits 28 and 30 each provide approximately 22.6 square inches of cross-sectional area. In the preferred embodiment, upper gas orifices 35 have a diameter of 3/32 inch and are spaced at four orifices per axial foot of filter block. Lower gas orifices 33 have a diameter of ⅛ inch and are also spaced at four orifices per axial foot of filter block. Liquid orifices 48 and 50 have a diameter of ⅜ inch and are spaced at two orifices per axial foot of filter block.

In the preferred embodiment, it has been found that the slightly larger diameter of lower gas orifices 33 over the diameter of upper gas orifices 35 is beneficial to a rapid evacuation of liquid from primary gas conduit 38 during gas backwashing. It has been found that a 50 foot length of primary gas conduit 38 in a filter block assembly can be evacuated of liquid at normal gas backwash pressures within ten seconds from the start of gas backwash operations. Also, primary gas conduit 38 is essentially fully evacuated of liquid at the extremely low gas backwash rate of 1 SCFM.

Since primary gas conduit 38 is essentially completely evacuated of liquid during gas backwashing, a number of problems inherent in prior art designs are overcome. The otherwise severe effects of non-level installation of the filter blocks is almost completely overcome. So also, are the effects of surface waves on the filter liquid overcome. Additionally, since there is no significant gas/liquid interface in primary gas conduit 38 during gas backwash, the problem of standing waves is avoided.

Having separate conduits for gas and liquid backwashing allows independent adjustment of either or both of the gas or liquid flow rates during backwash operations, an option not possible with the prior art devices. It has been found that the desired flow rates of 5 SCFM gas and simultaneous 10 GSFM can be accomplished in the design of the preferred embodiment. It has been found that gas backwash rates of 1-10 SCFM can be realized in the present invention.

It will also be apparent from FIG. 1 that the ribs 21 along the upper portion of the block 10 are in staggered relationship relative to the ribs 20 surrounding the side wall and bottom wall 18 along the lower portion of the block. In addition, a plurality of spaced perpendicularly extending flange members 52 are provided along each side wall 16 immediately above the position where the lower ribs 20 terminate. These will not only assist in handling the individual blocks but in placement and positioning of the blocks along the bottom of the filter bed. In addition, the side wall 16 may be provided with a plurality of indentations 39 as shown in FIG. 1 to facilitate intimate contact with grouting material when the block is assembled in a filter bed bottom.

With reference now to FIG. 3, there is shown a sectional view along lines 3—3 of FIG. 1, illustrating the cooperation of an air inlet tube 56, which may be provided with a temporary cap 58, with an opening 60. The lower end of the tube 56 is secured about the opening 60 provided through the upper wall 12 whereby communication with the interior of primary gas conduit 38 is effected. The upper end of tube 56 will be connected to a pressurized air or gas supply. As an alternative, in this embodiment as well as the embodiment described below, gas may be introduced into primary gas conduit 38 through a pipe that is provided with spaced openings with the pipe extending in primary gas conduit 38 parallel to the wall 24. It will be understood, as shown in FIG. 4, that each section of filter block in the filter bottom does not need to include an air inlet tube 56.

The filter block of the present invention is further characterized by the ratio of the sum of the cross-sectional areas, of the secondary conduits 36 and 40 relative to the primary liquid conduits 28 and 30. This unique ratio of cross-sectional areas allows for significant reduction in head loss during the backwash cycle. Specifically, the ratio of the combined cross-sectional areas of primary conduits 28 and 30 to the combined cross-sectional areas of the secondary liquid conduits 36 and 40 ranges from about 1 to 5:1 and, preferably, the ratio ranges from about 1.5–3.5:1.

A filter bottom must provide uniform distribution of backwash gas and liquid, for example air and water, over the entire area of the filter. As is well known, lack of uniformity can seriously impair the effectiveness of the filter because various portions of the bed may retain deposited particulate even after a backwash cycle. The useful life of a filter is directly proportional to the uniformity of distribution of the backwash medium. Localized variations in distribution of the backwash flow will disrupt the filtration support media layers, necessitating frequent replacement and/or regrading. A uniform distribution of backwash gas and liquid is dependent upon uniform distribution of the backwash liquid from primary liquid conduits 28 and 30 into secondary conduits 36 and 40. According to the present invention, this is more readily achievable by maintaining air or gas under pressure in primary gas conduit 38 and the distribution of that gas through gas orifices 33 and 35 into secondary conduits 36 and 40. Also, by maintaining primary gas conduit 38 under adequate gas pressure slight variations in the levelness of adjacent blocks will not cause significant variations in the distribution of the backwash flow. In addition, it has been found that whereas prior block structures could only tolerate a feed rate of 3–5 SCFM per square foot over the filter bed, the present invention can accommodate gas backwash rates of 1–10 SCFM per square foot of the filter bed without significant disruption of the filter layers or unacceptably high energy losses in gas distribution.

The filter block lo of the present invention may be made of fired clay or a light weight, high density, injection molded plastic such as polyethylene of high molecular weight. The polyethylene is more easy to handle and more durable during transportation and installation. Alternatively, the exterior and interior walls of block 10 may be extruded to form continuous lengths of filter block.

With reference now to FIG. 4, there are shown two blocks 10 of the present invention connected end-to-end with flange 23 inserted into collar 22 of an adjacent block 10. A bracket member 60 may be employed to secure the ends of the block in abutting relationship as shown. The ribs 20 extending around the lower portion of each block will rest on a previously constructed floor 62 in a tank 68. Rows of blocks assembled as shown in FIG. 4 will extend across the floor 62 of the tank 68 with the ends of the rows connected to a common header 70 which in turn is connected through a duct 72 to a pump 74. It will be understood that this arrangement is illustrative in that other designs may be employed.

Conventionally, a plurality of layers of particulate material 76 are deposited over the top walls of all the rows of blocks 10 to a level deemed sufficient to effect the degree of cleansing required for the liquid to be treated. The block 10 located adjacent one of the walls of the tank will be connected through its tube 56 to a source of gas such as air under pressure by a tube 57 provided for each row of blocks 10. Suitable valving controls would, of course, be employed and since these are of conventional construction, they need not be further described herein. Alternatively, the tube 56 may be omitted and the gas supplied to primary gas conduit 38 by a flume and sleeve arrangement in tank 68 or by separate air blocks positioned between tank 68 and the end of each row of filter blocks 10.

In the embodiment described above, the apex of the primary gas conduit 38 is formed integrally with the top wall 12 and thereby provides support for the wall 12 which carries the weight of the filter media thereon. Thus, the blocks 10 may be constructed of lighter material without sacrificing structural stability.

The present invention, having primary liquid conduits on the lower level of the filter block and the primary gas conduit substantially in the upper level of the filter block, also provides the advantage that portions of side walls 16 of the primary liquid conduits can be cut away between adjacent filter blocks to allow further equalization (by flow across the rows of filter blocks) of liquid backwash flow during backwash operations.

In alternate embodiments of the present invention, the primary gas conduit can be fashioned in cross-section so that its apex does not extend to the top wall of the filter block. In such case, the secondary conduits can comprise either one or two conduits. Additionally, the primary gas conduit can be of numerous different cross-sectional designs, and it may in some cases consist of a cylindrical conduit centrally disposed within the secondary conduit. It is preferred, although not necessary, that the primary gas conduit be symmetrically disposed about a vertical plane extending through the axis of the filter block.

In other embodiments of the present invention, the primary liquid conduits can comprise a single conduit as can the secondary conduits.

Having described the invention, it will be apparent to those skilled in this art that various modifications may be made thereto without departing from the spirit and scope of this invention as defined in the appended claims.

We claim:

1. A block for use in draining and backwashing a filtering media in a filter bed of the type where liquid may be supplied to the filtering media from a position vertically above the media and passed down through the media to an underdrain system including a plurality of said blocks, said block comprising:

a plurality of exterior walls defining a hollow interior and having a longitudinal axis, said exterior walls including a top wall, a bottom wall and a pair of side walls extending between said top wall and said bottom wall;

a plurality of interior walls defining at least one lower primary liquid conduit and at least one upper secondary liquid conduit, and also defining a primary gas conduit, said primary gas conduit having a plurality of gas orifices communicating with said upper secondary liquid conduit, said lower primary liquid conduit having a plurality of liquid orifices communicating with said upper secondary liquid conduit.

2. The block of claim 1 wherein said interior walls include a transverse wall extending from one side wall to the opposite side wall and substantially parallel to said top and bottom walls, said transverse wall being vertically spaced from said bottom wall.

3. The block of claim 2 including at least one partition extending between said transverse wall and said bottom wall.

4. A block for use in draining and backwashing a filtering media in a filtering bed of the type where liquid may be supplied to the filtering media from a position vertically above the media and passed down through the media to an underdrain system including a plurality of said blocks, said block comprising:
a plurality of exterior walls defining a hollow interior and having a longitudinal axis, said exterior walls including a top wall, a bottom wall and a pair of side walls extending between said top wall and said bottom wall;
a plurality of interior walls defining an upper portion and a lower portion, said lower portion having at least two primary liquid conduits and said upper portion having at least one secondary liquid conduit with a primary gas conduit disposed within said secondary liquid conduit, said interior walls including a plurality of gas orifices between said primary gas conduit and said secondary liquid conduit and further including a plurality of liquid orifices between each primary liquid conduit and said secondary liquid conduit.

5. The block of claim 4 wherein said primary gas conduit is defined by two inclined interior walls providing said primary gas conduit with a vertically tapering cross-section and wherein said gas orifices are disposed in each of said two inclined walls.

6. The block of claim 5 wherein said gas orifices comprise a plurality of upper gas orifices and a plurality of lower gas orifices.

7. The block of claim 6 wherein said upper gas orifices have smaller cross-sectional areas than said lower gas orifices.

8. The block of claim 4 further comprising means for admitting a gas under pressure to the interior of said primary gas conduit.

9. The block of claim 8 wherein said means for admitting a gas is a pipe passing through said top wall and adjacent an end of said block, said pipe having one end thereof in fluid communication with said primary gas conduit.

10. The block of claim 5 wherein said inclined walls contact and support said top wall of said block substantially along the length of said block.

11. The block of claim 4 wherein an end of said block is provided with collar means for receiving an opposite end of an adjacent block.

12. The block of claim 4 further including a plurality of orifices in said top wall for metering a gas, during backwashing, from said block to an overlying filter material.

13. The block of claim 4 wherein said block is formed of molded, high-density polyethylene.

14. The block of claim 4 having external, spaced ribs extending from at least one of said walls.

15. The block of claim 4 wherein said interior walls include a transverse wall extending from one side wall to the opposite side wall and substantially parallel to said top and bottom walls, said transverse wall being vertically spaced from said bottom wall.

16. The block of claim 15 including at least one partition extending between said transverse wall and said bottom wall.

17. A method of backwashing a filter bottom comprising an assembly of filter blocks, each filter block having a top surface disposed below a filter media and each filter block comprising a lower primary liquid conduit, an upper secondary liquid conduit and a primary gas conduit, said secondary liquid conduit having apertures providing fluid communication between the top surface of the filter block and the secondary liquid conduit, said primary liquid conduit having at least one orifice providing liquid communication between said secondary liquid conduit and said primary liquid conduit, said primary gas conduit having a plurality of gas orifices providing gas communication between said primary gas conduit and said secondary liquid conduit, said method comprising the steps of:
(1) simultaneously supplying gas backwash flow to said primary gas conduit and liquid backwash flow to said primary liquid conduit so that said gas backwash flow continues from said primary gas conduit through at least a portion of said gas orifices to said secondary liquid conduit;
(2) directing said gas backwash flow through said apertures to said filter media; and
(3) directing said liquid backwash flow from said primary liquid conduit through at least a portion of said liquid orifices to said secondary liquid conduit and thereafter through said apertures to said filter media.

* * * * *

UNITED STATES PATENT AND TRADEMARK OFFICE
CERTIFICATE OF CORRECTION

PATENT NO.   :   5,108,627
DATED        :   April 28, 1992
INVENTOR(S)  :   Dean T. Berkebile and Gerald D. Wolfe It is certified that error appears in the above-identified patent and that said Letters Patent is hereby corrected as shown below:

Abstract Line 3 after "least" delete --a--.

Column 5 Line 31 after "shape to" insert
    --interfit with the collar 22 of an adjacent block to--.

Column 7 Line 54 "block lo" should read --block 10--.

Signed and Sealed this

Seventeenth Day of August, 1993

Attest:

BRUCE LEHMAN

*Attesting Officer*          *Commissioner of Patents and Trademarks*